(12) United States Patent
Gibson et al.

(10) Patent No.: US 7,805,412 B1
(45) Date of Patent: Sep. 28, 2010

(54) SYSTEMS AND METHODS FOR PARALLEL RECONSTRUCTION OF FILES AND OBJECTS

(75) Inventors: Garth Gibson, Pittsburgh, PA (US); Nabeel Mian, Mississauga (CA); Jason Small, Pittsburgh, PA (US)

(73) Assignee: Panasas, Inc., Pittsburgh, PA (US)

( * ) Notice: Subject to any disclaimer, the term of this patent is extended or adjusted under 35 U.S.C. 154(b) by 427 days.

(21) Appl. No.: 11/972,695

(22) Filed: Jan. 11, 2008

(51) Int. Cl.
*G06F 17/30* (2006.01)

(52) U.S. Cl. ...................... 707/690; 707/691
(58) Field of Classification Search ............... 707/690, 707/691
See application file for complete search history.

(56) References Cited

U.S. PATENT DOCUMENTS

| | | | |
|---|---|---|---|
| 6,535,869 B1 * | 3/2003 | Housel, III ...................... | 1/1 |
| 6,631,365 B1 * | 10/2003 | Neal et al. ...................... | 1/1 |
| 6,745,211 B2 * | 6/2004 | Kabasakalian et al. ............ | 1/1 |
| 6,789,092 B1 * | 9/2004 | Oppedahl et al. ................ | 1/1 |
| 6,985,995 B2 | 1/2006 | Holland et al. | |
| 7,039,643 B2 * | 5/2006 | Sena et al. ...................... | 1/1 |
| 7,143,120 B2 * | 11/2006 | Oks et al. ....................... | 1/1 |
| 2004/0215733 A1 * | 10/2004 | Gondhalekar et al. ....... | 709/207 |
| 2005/0081097 A1 * | 4/2005 | Bacher et al. ................. | 714/13 |
| 2006/0020942 A1 * | 1/2006 | Ly et al. ...................... | 718/100 |
| 2007/0260718 A1 * | 11/2007 | Shenfield ..................... | 709/223 |
| 2007/0299714 A1 * | 12/2007 | Levine et al. ................. | 705/9 |

OTHER PUBLICATIONS

"Distributed Operating Systems and Algorithms", Randy Chow, et al., Feb. 1998, pp. 162-167, ISBN 0-201, 49838-3.

* cited by examiner

*Primary Examiner*—Don Wong
*Assistant Examiner*—Kim T Nguyen
(74) *Attorney, Agent, or Firm*—Morgan, Lewis & Bockius, LLP

(57) ABSTRACT

Parallel reconstruction of file components following a failure of one or more of the storage devices is implemented in the context of a storage system that includes a plurality of storage devices for storing file components and a plurality of metadata managers. A storage device having one or more unrecoverable read errors requiring reconstruction is identified. A metadata manager which will serve as a scheduler, and a plurality of metadata managers which serve as a plurality of workers, are identified. The plurality of workers includes metadata managers other than the scheduler. A scheduler service running on the metadata manager identified as the scheduler is used to construct a list of file components from the storage device affected by the one or more unrecoverable read errors requiring reconstruction. The scheduler service assembles a work list corresponding to each of a plurality of the workers. The work list for each worker includes a subset of file components from the list requiring reconstruction. The scheduler service instructs each worker to reconstruct data contained in the subset of file components on the work list of said worker. In response to the instructions from the scheduler service, the plurality of workers operates in parallel to reconstruct the data contained in the file components requiring reconstruction.

15 Claims, 4 Drawing Sheets

SYSTEMS AND METHODS FOR PARALLEL RECONSTRUCTION OF FILES AND OBJECTS

FIELD OF THE INVENTION

The present invention is directed to systems and methods for reconstruction of files and objects.

BACKGROUND OF THE INVENTION

With increasing reliance on electronic means of data communication, different models to efficiently and economically store a large amount of data have been proposed. In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client. By contrast, in an object-based data storage system, each object-based storage device communicates directly with clients over a network. An example of an object-based storage system is shown in commonly-owned, U.S. Pat. No. 6,985,885, filed on Mar. 29, 2002, titled "Data File Migration from a Mirrored RAID to a Non-Mirrored XOR-Based RAID Without Rewriting the Data," incorporated by reference herein in its entirety.

The present invention includes various improvements over existing systems, and provides solutions for facilitating reconstruction of files and objects, and is applicable to both traditional networked data storage systems and object-based data storage systems.

SUMMARY OF THE INVENTION

The present invention is directed to a system and method for parallel reconstruction of file components following a failure of one or more of storage devices. The system and method are implemented in the context of a storage system that includes a plurality of storage devices for storing file components and a plurality of metadata managers. A storage device having one or more unrecoverable read errors requiring reconstruction is identified. A metadata manager which will serve as a scheduler, and a plurality of metadata managers which serve as a plurality of workers, are identified. The plurality of workers includes metadata managers other than the scheduler. A scheduler service running on the metadata manager identified as the scheduler is used to construct a list of file components from the storage device affected by the one or more unrecoverable read errors requiring reconstruction. The scheduler service assembles a work list corresponding to each of a plurality of the workers. The work list for each worker includes a subset of file components from the list requiring reconstruction. The scheduler service instructs each worker to reconstruct data contained in the subset of file components on the work list of said worker. In response to the instructions from the scheduler service, the plurality of workers operates in parallel to reconstruct the data contained in the file components requiring reconstruction. In alternative embodiments, storage nodes (rather than, or in combination with, metadata managers) may act as workers that operate in parallel to reconstruct the data contained in the file components requiring reconstruction. In some embodiments, the unrecoverable read errors are the result of a catastrophic failure associated with one or more of the plurality of storage devices.

In some embodiments, each metadata manager is assigned primary responsibility for a subset of the files stored on the storage device, and a plurality of metadata managers are identified as schedulers, with each scheduler responsible for scheduling reconstruction of the subset of files for which it has primary responsibility, and each worker accepting work lists from one or more schedulers.

In some embodiments, each worker periodically sends a progress report message to each scheduler for which said worker is doing work. The progress report is an indication that the worker is still operating and/or an indication of current progress on the work list of the worker. In a specific embodiment each scheduler monitors the frequency of progress reports from workers to whom the scheduler has assigned work, and reassigns a work list to another worker if the worker currently assigned said list fails to send said progress report within a prescribed amount of time. In other embodiments, the scheduler monitors a rate of progress of workers to whom the scheduler has assigned work, and reassigns work from a given worker to another worker if the rate of progress of the given worker fails to meet a predetermined threshold.

In some embodiments, a worker preferentially accepts new work lists from the scheduler that submitted the work list most recently completed by said worker. Each worker may update metadata of surviving file components associated with a reconstructed file component and reconstruct data in the file component.

The teachings of the present invention may also be applied in the context of a storage system that includes a plurality of object storage devices for storing object components, in order perform parallel reconstruction of object components following a failure of one or more of the storage devices.

In some embodiments, the scheduler service constructs the list of file components affected by the one or more unrecoverable read errors requiring reconstruction by requesting a list of file components unaffected by the one or more unrecoverable read errors and stored on each of the plurality of storage devices. For each file component unaffected by the one or more unrecoverable read errors, the scheduler service (i) inspects a pointer stored in an attribute field of the file component; wherein the pointer points to a further component of a corresponding file; and (ii) identifies files with at least one component having an attribute field that includes a pointer that points to a further component residing on an object storage device affected by the one or more unrecoverable read errors. The retrieval of lists of such file components optionally proceeds in parallel on more than one storage device simultaneously.

The scheduler service may designate in the work list a target storage device to receive reconstructed data, where all files in said work list share a common target storage device.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the figures and descriptions of the present invention included herein, illustrate and describe elements that are of particular relevance to the present invention, while eliminating, for purposes of clarity, other elements found in typical data storage systems or networks.

Embodiments set forth below correspond to examples of object-based data storage implementations of the present invention. It will be understood by those skilled in the art that various teachings of the present invention can be applied in both object-based data storage systems, as well as other data storage systems.

Figure 1:
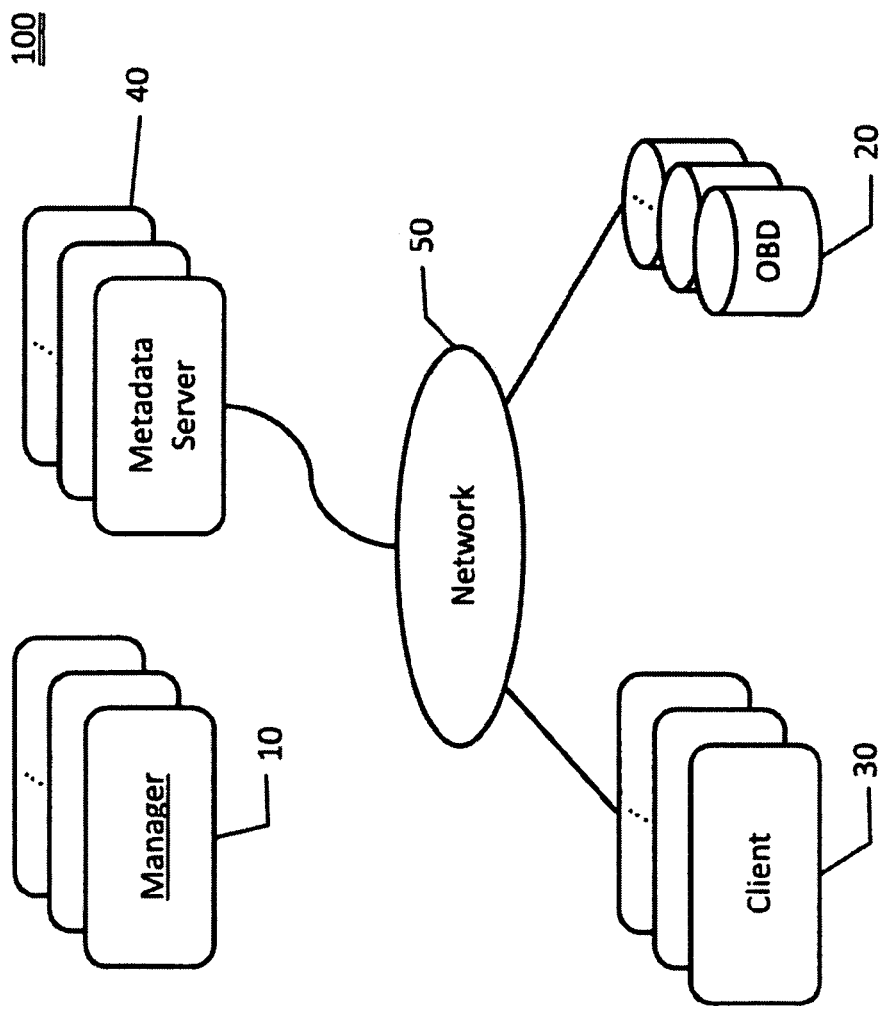
FIG. 1 illustrates an exemplary network-based file storage system designed around Object-Based Secure Disks (OBDs)

FIG. 1 illustrates an exemplary network-based file storage system 100 designed around Object Based Secure Disks (OBDs) 20. File storage system 100 is implemented via a combination of hardware and software units and generally consists of manager software (simply, the "manager") 10, OBDs 20, clients 30 and metadata server 40. It is noted that each manager is an application program code or software running on e.g., a corresponding server such as a metadata server 40. Clients 30 may run different operating systems, and present a file system interface which may be integrated with the operating system Metadata stored on or managed by server 40 may include file and directory object attributes as well as directory object contents. The term "metadata" generally refers not to the underlying data itself, but to the attributes or information that describe that data.

FIG. 1 shows a number of OBDs 10 attached to the network 50. An OBD 10 is a physical disk drive that stores data files in the network-based system 100 and may, for example, have the following properties: (1) it presents an object-oriented interface (rather than a sector-oriented interface); (2) it attaches to a network (e.g., the network 50) rather than to a data bus or a backplane (i.e., the OBDs 10 may be considered as first-class network citizens); and (3) it enforces a security model to prevent unauthorized access to data stored thereon.

The fundamental abstraction exported by an OBD 10 is that of an "object," which may be defined as a variably-sized ordered collection of bits. Contrary to more traditional block-based storage disks, OBDs do not primarily export a sector-based interface, but instead export an object-based interface which provides commands for manipulating objects. Objects on an OBD can be created, removed, written, read, appended to, etc. The OBD may also provide commands for manipulating collections or groups of objects as a whole. OBDs do not require the host to manage the disk geometry or block allocation, and may implement layout optimizations internally, utilizing higher-level information that can be provided through the object-based storage protocol the OBD implements. In one embodiment, each data file and each file directory in the file system 100 are stored using one or more OBD objects. Because of object-based storage of data files, each file object may generally be read, written, opened, closed, expanded, created, deleted, moved, sorted, merged, concatenated, named, renamed, and include access limitations. Each OBD 10 communicates directly with clients 30 on the network 50, possibly through routers and/or bridges. The OBDs, clients, managers, etc., may be considered as "nodes" on the network 50. In system 100, no assumption needs to be made about the network topology except that various nodes should be able to contact other nodes in the system either directly or through a proxy. Servers (e.g., metadata servers 40) in the network 50 merely enable and facilitate data transfers between clients and OBDs, but the servers do not normally implement such transfers.

Logically speaking, various system "agents" (i.e., the managers 10, the OBDs 20 and the clients 30) are independently-operating network entities. Manager 10 may provide day-to-day services related to individual files and directories, and manager 10 may be responsible for all file- and directory-specific states. Manager 10 creates, deletes, and sets attributes on entities (i.e., files or directories) on clients' behalf. Manager 10 also carries out the aggregation of OBDs for performance and fault tolerance. "Aggregate" objects are objects that use OBDs in parallel and/or in redundant configurations, yielding higher availability of data and/or higher I/O performance. Aggregation is the process of distributing a single data file or file directory over multiple OBD objects, for purposes of performance (parallel access) and/or fault tolerance (storing redundant information). The aggregation scheme associated with a particular object may optionally be stored as an attribute of that object on an OBD 20. A system administrator (e.g., a human operator or software) may choose any aggregation scheme for a particular object. Both files and directories can be aggregated. In one embodiment, a new file or directory inherits the aggregation scheme of its immediate parent directory, by default. Manager 10 may be allowed to make layout changes for purposes of load or capacity balancing.

The manager 10 may also allow clients to perform their own I/O to aggregate objects (which allows a direct flow of data between an OBD and a client), as well as providing proxy service when needed. As noted earlier, individual files and directories in the file system 100 may be represented by unique OBD objects. Manager 10 may also determine exactly how each object will be laid out—i.e., on which OBD or OBDs that object will be stored, whether the object will be mirrored, striped, parity-protected, etc. Manager 10 may also provide an interface by which users may express minimum requirements for an object's storage (e.g., "the object must still be accessible after the failure of any one OBD").

Each manager 10 may be a separable component in the sense that the manager 10 may be used for other file system configurations or data storage system architectures. In one embodiment, the topology for the system 100 may include a "file system layer" abstraction and a "storage system layer" abstraction. The files and directories in the system 100 may be considered to be part of the file system layer, whereas data storage functionality (involving the OBDs 20) may be considered to be part of the storage system layer. In one topological model, the file system layer may be on top of the storage system layer.

A storage access module (SAM) (not shown) is a program code module that may be compiled into managers and clients. The SAM includes an I/O execution engine that implements simple I/O, mirroring, and map retrieval algorithms discussed below. The SAM generates and sequences the OBD-level operations necessary to implement system-level I/O operations, for both simple and aggregate objects.

Each manager 10 maintains global parameters, notions of what other managers are operating or have failed, and provides support for up/down state transitions for other managers. A benefit to the present system is that the location information describing at what data storage device (i.e., an OBD) or devices the desired data is stored may optionally be located at a plurality of OBDs in the network. In such an embodiment, a client 30 need only identify one of a plurality of OBDs containing location information for the desired data to be able to access that data. The data may be returned to the client directly from the OBDs without passing through a manager.

Figure 2:
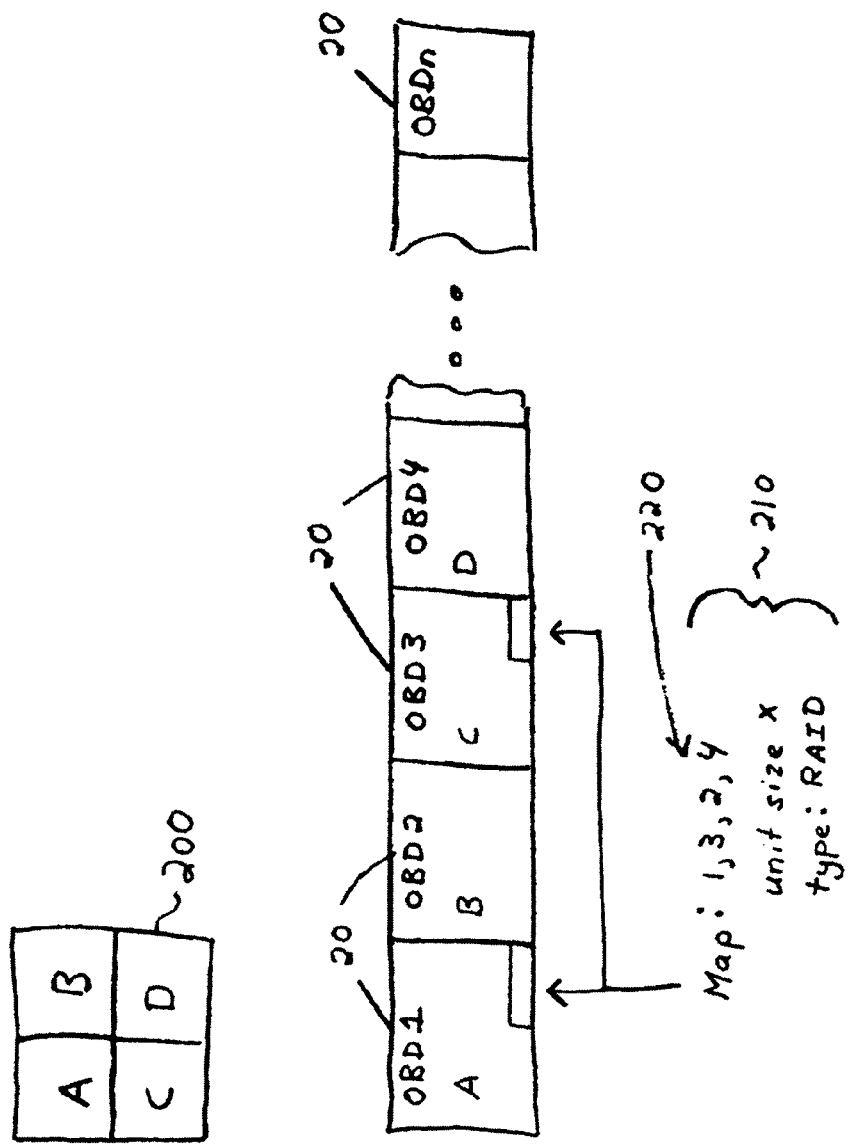
FIG. 2 illustrates a map of a file object having multiple components on different OBDs.

FIG. 2 illustrates the decentralized storage of a map 210 of an exemplary file object 200 having multiple components (e.g., components A, B, C, and D) stored on different OBDs 20, in accordance with the present invention. In the example shown, the object-based storage system includes n OBDs 20 (labeled OBD1, OBD2 ... OBDn), and the components A, B, C, and D of exemplary file object 200 file are stored on OBD1, OBD2, OBD3 and OBD4, respectively. A map 210 that includes, among other things, a list 220 of object storage, devices where the components of exemplary file object 200 reside. Map 210 is stored as at least one component object attribute on an object storage device (e.g., OBD1, OBD3, or both) and includes information about organization of the components of the file object on the object storage devices on the list. For example, list 220 specifies that the first, second, third and fourth components (i.e., components A, B, C and D) of file object 200 are stored on OBD1, OBD3, OBD2 and OBD4, respectively. In the embodiment shown, OBD1 and OBD3 contain redundant copies of map 210.

In one embodiment, exemplary file object 200 having multiple components on different object storage devices is accessed by issuing a file access request from a client 30 to an object storage device 20 (e.g., OBD1) for the file object. In response to the file access request, map 210 (which is stored as at least one component object attribute on the object storage device) is located on the object storage device, and sent to the requesting client 30 which retrieves the components of the requested file object by issuing access requests to each of the object storage devices listed on the map.

Figure 3:
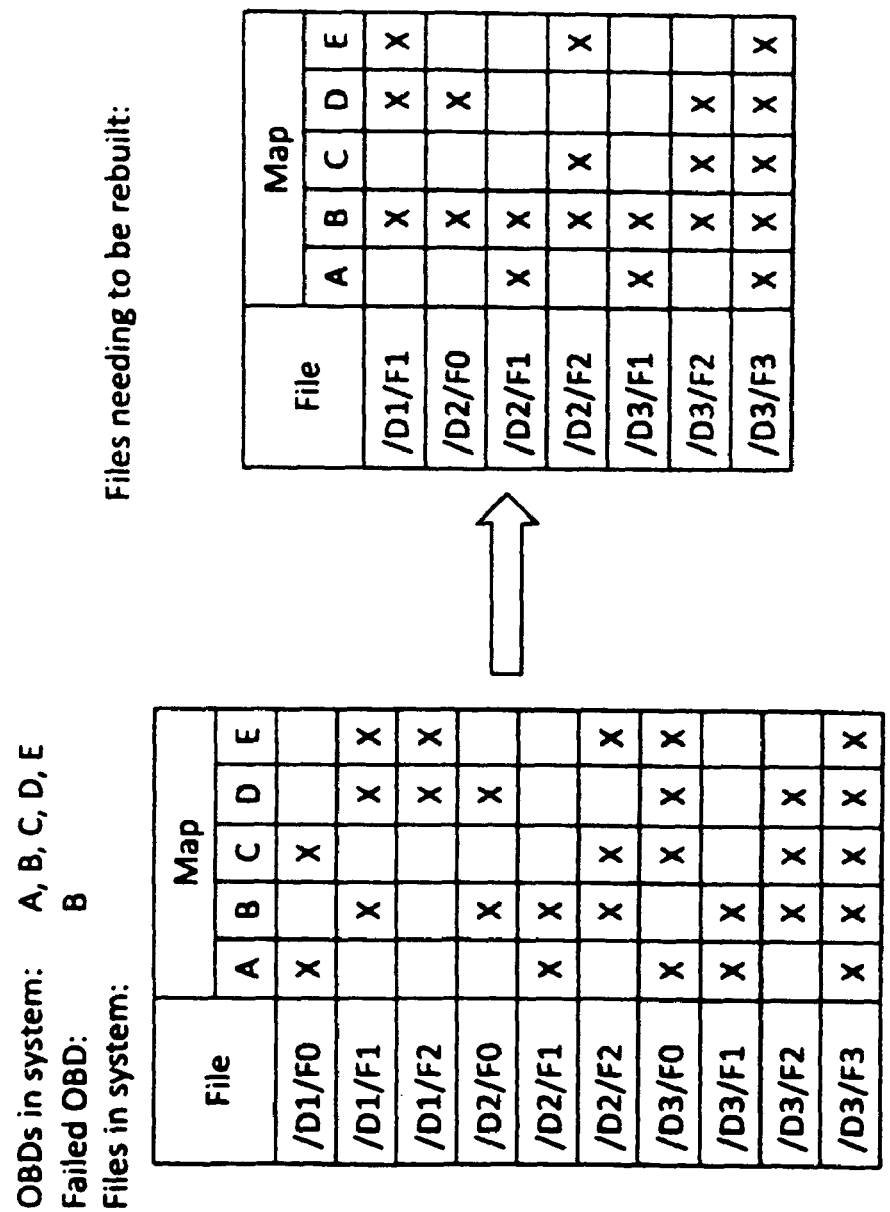
FIG. 3 illustrates an exemplary list of file components requiring reconstruction.
Figure 4:
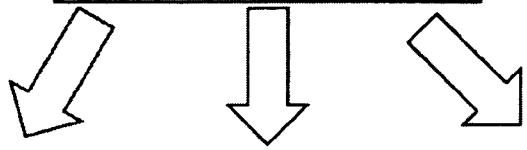
FIG. 4 illustrates an exemplary work list.

Network-based file storage system 100 performs parallel reconstruction of file components following a failure of one or more of the storage devices 20. Following identification of a storage device 20 having one or more unrecoverable read errors, a metadata manner 10 is identified to act as a scheduler, and a plurality of metadata managers 10 which serve as a plurality of workers are also identified. The plurality of workers includes metadata managers 10 other than the scheduler. A scheduler service running on the metadata manager identified as the scheduler constructs a list of file components from the storage device 20 requiring reconstruction. An example of such a list is shown in FIG. 3. The scheduler service assembles a work list corresponding to each of a plurality of the workers. An example of a work list is shown in FIG. 4. The work list for each worker includes a subset of file components from the list requiring reconstruction. The scheduler service instructs each worker to reconstruct data contained in the subset of file components on the work list of said worker. In response to the instructions from the scheduler service, the plurality of workers operates in parallel to reconstruct the data contained in the file components requiring reconstruction. In alternative embodiments, storage nodes (rather than, or in combination with, metadata managers) may act as workers that operate in parallel to reconstruct the data contained in the file components requiring reconstruction. A storage node corresponds to an OBD (such as OBD 10). Where a storage node acts as a worker, software running on the OBD is used to implement the reconstruction worker functionality.

In one embodiment, each metadata manager 10 is assigned primary responsibility for a subset of the files stored on a given storage device 20, and a plurality of metadata managers are identified as schedulers for the subset of files, with each scheduler responsible for scheduling reconstruction of the subset of files for which it has primary responsibility, and each worker accepting work lists from one or more schedulers. Optionally, each worker periodically sends a progress report message to each scheduler for which said worker is doing work. The progress report is an indication that the worker is still operating and/or an indication of current progress on the work list of the worker. In a specific embodiment, each scheduler monitors the frequency of progress reports from workers to whom the scheduler has assigned work, and reassigns a work list to another worker if the worker currently assigned said list fails to send said progress report within a prescribed amount of time. In other embodiments, the scheduler monitors a rate of progress of workers to whom the scheduler has assigned work, and reassigns work from a given worker to another worker if the rate of progress of the given worker fails to meet a predetermined threshold.

A worker may preferentially accept new work lists from the scheduler that submitted the work list most recently completed by said worker. Each worker may update metadata of surviving file components associated with a reconstructed file component and reconstruct data in the file component.

In some embodiments, the scheduler constructs the list of file components affected by the one or more unrecoverable read errors requiring reconstruction by requesting a list of file components unaffected by the one or more unrecoverable read errors and stored on each of the OBD's. For each file component unaffected by the one or more unrecoverable read errors, the scheduler (i) inspects a pointer stored in an attribute field of the file component; wherein the pointer points to a further component of a corresponding file; and (ii) identifies files with at least one component having an attribute field that includes a pointer that points to a further component residing on an object storage device affected by the one or more unrecoverable read errors. The retrieval of lists of such file components may proceed in parallel on more than one OBD simultaneously. The scheduler may optionally designate in the work list a target OBD to receive reconstructed data, where all files in the work list share a common target OBD. Implementation of this option may result in a reduction in interference that occurs when read and write operations are performed on the same storage device.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a storage system that includes a plurality of storage devices for storing file components and a plurality of metadata managers, a parallel method for reconstructing file components following the failure of one or more of the storage devices, comprising:

identifying a storage device having one or more unrecoverable read errors requiring reconstruction;

identifying a metadata manager which serves as a scheduler;

identifying a plurality of metadata managers which serve as a plurality of workers;

constructing, with a scheduler service running on the metadata manager identified as the scheduler, a list of file components affected by the one or more unrecoverable read errors requiring reconstruction;

assembling, with the scheduler service running on the metadata manager identified as the scheduler, a work list corresponding to each of a plurality of the workers, wherein the work list for each worker includes a subset of file components from the list requiring reconstruction, and wherein the plurality of workers include metadata managers other than the scheduler; and instructing, with the scheduler service running on the metadata manager identified as the scheduler, each worker to reconstruct data contained in the subset of file components on the work list of said worker; and wherein, in response to said instructing, the plurality of workers operate in parallel to reconstruct the data contained in the file components requiring reconstruction.

2. The method of claim 1, where each metadata manager is assigned primary responsibility for a subset of the files stored on the storage device, and wherein a plurality of metadata managers are identified as schedulers, with each scheduler responsible for scheduling reconstruction of the subset of files for which it has primary responsibility, and each worker accepting work lists from one or more schedulers.

3. The method of claim 1, wherein each worker periodically sends a progress report message to each scheduler for which said worker is doing work, said progress report including one or more of: an indication that the worker is still operating; an indication of current progress on the work list of the worker.

4. The method of claim 3, wherein each scheduler monitors the frequency of progress reports from workers to whom the scheduler has assigned work, and reassigns a work list to another worker if the worker currently assigned said list fails to send said progress report within a prescribed amount of time.

5. The method of claim 1, wherein the scheduler monitors a rate of progress of workers to whom the scheduler has assigned work, and reassigns work from a given worker to another worker if the rate of progress of the given worker fails to meet a predetermined threshold.

6. The method of claim 1, wherein a worker preferentially accepts new work lists from the scheduler that submitted the work list most recently completed by said worker.

7. The method of claim 1, wherein each worker updates metadata of surviving file components associated with a reconstructed file component and reconstructs data in the file component.

8. The method of claim 1, wherein the scheduler service constructs the list of file components affected by the one or more unrecoverable read errors requiring reconstruction by requesting a list of file components unaffected by the one or more unrecoverable read errors and stored on each of the plurality of storage devices; and for each said file component unaffected by the one or more unrecoverable read errors, the scheduler service performs the following steps:

(i) inspecting a pointer stored in an attribute field of the file component; wherein the pointer points to a further component of a corresponding file; and (ii) identifying files with at least one component having an attribute field that includes a pointer that points to a further component residing on an object storage device affected by the one or, more unrecoverable read errors.

9. The method of claim 8, wherein retrieval of lists of file components proceeds in parallel to more than one storage device simultaneously.

10. The method of claim 1, wherein the scheduler service designates in the work list a target storage device to receive reconstructed data, and all files in said work list share a common target storage device.

11. The method of claim 1, wherein the unrecoverable read errors are the result of a catastrophic failure associated with one or more of the plurality of storage devices.

12. The method of claim 1, further comprising identifying a plurality of metadata managers and at least one storage node which serve as the plurality of workers.

13. In a storage system that includes a plurality of object storage devices for storing object components and a plurality of metadata managers, a parallel method for reconstructing object components following the failure of one or more of the storage devices, comprising:

identifying a storage device having one or more unrecoverable read errors requiring reconstruction;

identifying a metadata manager which serves as a scheduler;

identifying a plurality of metadata managers which serve as a plurality of workers;

constructing, with a scheduler service running on the metadata manager identified as the scheduler, a list of object components from the storage device affected by the one or more unrecoverable read errors requiring reconstruction;

assembling, with the scheduler service running on the metadata manager identified as the scheduler, a work list corresponding to each of a plurality of the workers, wherein the work list for each worker includes a subset of object components from the list requiring reconstruction, and wherein the plurality of workers include metadata managers other than the scheduler; and instructing, with the scheduler service running on the metadata manager identified as the scheduler, each worker to reconstruct data contained in the subset of object components on the work list of said worker; and wherein, in response to said instructing, the plurality of workers operate in parallel to reconstruct the data contained in the object components requiring reconstruction.

14. In a storage system that includes a plurality of storage devices for storing file components, a parallel method for reconstructing file components following the failure of one or more of the storage devices, comprising:

identifying a storage device having one or more unrecoverable read errors requiring reconstruction;

identifying a metadata manager which serves as a scheduler;

identifying a plurality of storage nodes which serve as a plurality of workers;

constructing, with a scheduler service running on the metadata manager identified as the scheduler, a list of file components affected by the one or more unrecoverable read errors requiring reconstruction;

assembling, with the scheduler service running on the metadata manager identified as the scheduler, a work list corresponding to each of a plurality of the workers, wherein the work list for each worker includes a subset of file components from the list requiring reconstruction; and instructing, with the scheduler service running on the metadata manager identified as the scheduler, each worker to reconstruct data contained in the subset of file components on the work list of said worker; and wherein, in response to said instructing, the plurality of workers operate in parallel to reconstruct the data contained in the file components requiring reconstruction.

15. The method of claim 14, further comprising identifying a plurality of storage nodes and at least one metadata manager which serve as the plurality of workers.

\* \* \* \* \*